United States Patent [19]

Patti et al.

[11] Patent Number: 5,014,460
[45] Date of Patent: May 14, 1991

[54] COMBINATION LANTERN AND FLYING INSECT ERADICATOR

[75] Inventors: Anthony G. Patti, San Gabriel; Larry L. DeHart, Sr., Placentia; Larry L. DeHart, Jr., Walnut, all of Calif.

[73] Assignee: All Tech Industries, Brea, Calif.

[21] Appl. No.: 475,014

[22] Filed: Feb. 5, 1990

[51] Int. Cl.⁵ .............................................. A01M 1/04
[52] U.S. Cl. ........................................ 43/113; 43/107
[58] Field of Search ................................. 43/113, 107

[56] References Cited

U.S. PATENT DOCUMENTS

| | | |
|---|---|---|
| 1,168,798 | 1/1916 | Glass . |
| 2,893,161 | 7/1959 | Reid ..................................... 43/113 |
| 2,931,127 | 4/1960 | Mayo .................................... 43/113 |
| 3,058,257 | 10/1962 | Brophy et al. ....................... 43/113 |
| 3,123,933 | 3/1964 | Roche . |
| 3,196,577 | 7/1965 | Plunkett . |
| 4,141,173 | 2/1979 | Weimert et al. . |
| 4,282,673 | 8/1981 | Focks et al. . |
| 4,519,160 | 5/1985 | McBrayer . |
| 4,788,789 | 12/1988 | Boobar et al. . |
| 4,856,226 | 8/1989 | Taylor . |

FOREIGN PATENT DOCUMENTS 0522094 3/1931 Fed. Rep. of Germany ........ 43/113
8706795 11/1987 PCT Int'l Appl. ................... 43/113

Primary Examiner—Richard K. Seidel
Assistant Examiner—Patty E. Hong
Attorney, Agent, or Firm—Price, Gess & Ubell

[57] ABSTRACT

A streamlined housing contains an omnidirectional circular light source, an airflow channel with a flow restriction located just below the light source, and a motor driven fan with the fan blade located just below the restricted flow section of the airflow channel. The light source may be selectively directed by a movable reflecting screen. The fan motor and light source may be powered by a 12-volt D.C. source. The airflow channel is shaped to funnel airflow around the light source through the flow restricted area at high velocity, throwing the insects into a base container with deadly force. The base container has a large exhaust port and forms a part of the airflow channel. The airflow channel also acts to funnel and disperse the light from the light source so that the ground below the light source, as well as all directions above the level of the light source, are illuminated.

17 Claims, 2 Drawing Sheets

COMBINATION LANTERN AND FLYING INSECT ERADICATOR

BACKGROUND OF THE INVENTION

1. Field of the Invention

The present invention relates generally to improvements in outdoor lights for camping or home use and, more particularly, pertains to a new and improved lighting structure which also silently eradicates the insects that are attracted by the light.

2. Description of Related Art

Lighting systems that are used privately at camp sites or at home, and traditionally are driven by a low voltage power source, make no provision for eradicating the flying insects that are attracted to them. Although flying insect eradicating devices which utilize a light source are in use, these devices are built for the purpose of eradicating insects, and not for the purpose of providing light to the surrounding area. In other words, the light source in the prior art flying insect eradicating devices has no useful purpose other than to attract the insects to the eradicating device.

It is the object and general purpose of the present invention to provide an outdoor lantern for use in back yards or camp sites, providing the light required for the area surrounding the placement of the lantern, while at the same time silently eradicating all insects that are attracted to the lantern.

SUMMARY OF THE INVENTION

The objects and general purpose of the present invention are accomplished by housing a light source above a restriction in an airflow channel and utilizing the housing of the light source to help funnel the airflow into the restriction. The walls of the airflow channel are constructed to reflect light through the airflow channel, as well as to direct air through it. The airflow through the restricted area of the channel exhibits a greatly increased velocity. A fan is located at the restriction in the channel. Its motor is located out of the way in the light housing. The base provides support to the light housing, contains the exhaust end of the airflow channel with a big exhaust port in its bottom, and has a collector for the insects that are thrown against its walls with deadly force.

BRIEF DESCRIPTION OF THE DRAWINGS

The exact nature of this invention, as well as the other objects and advantages thereof, will be readily apparent from consideration of the following specification as related to the accompanying drawings, in which like reference numerals designate like parts throughout the figures thereof, and wherein.

DESCRIPTION OF THE PREFERRED EMBODIMENTS

Figure 1:
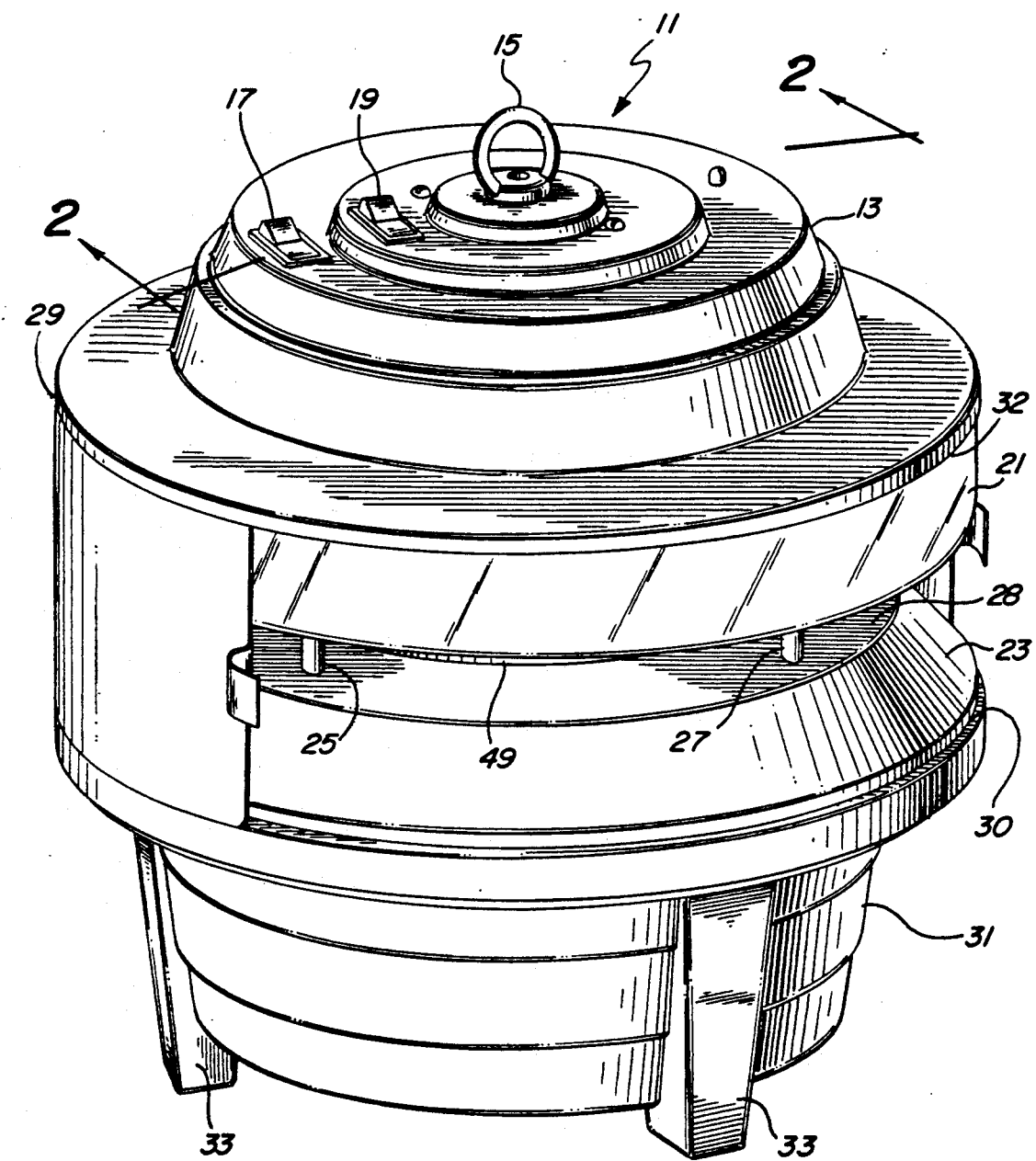
FIG. 1 is a perspective of the lantern of the present invention.

Referring first to FIG. 1, which illustrates a preferred embodiment of the combination lantern and flying insect eradicator 11 of the present invention, the invention is shown as comprising two components, a hood 13 and a base 31.

The hood 13 can be any convenient and aesthetic shape, such as the shape illustrated in FIG. 1. Because the invention is a lantern, it is convenient to provide a loop 15 on the hood 13 so that it may be hung from any convenient pole or tree, as desired. Control switches 17 and 19 for controlling the operation of the lantern may be located on the top of the hood, as shown. However, the switches may be located elsewhere on the lantern, as desired. The switches control the light source located in the hood 13 and the motor driven fan located in the lantern 11, as will be explained hereinafter.

The bottom 21 of the hood is made of a translucent material. A light source which, as will be explained hereinafter, is preferably a toroidal fluorescent tube, is housed in the hood 13. The light emanating through the translucent material, which is the bottom 21, projects in a 360-degree pattern away from the lantern 11, as well as down onto the top surface 23 of base 31, and to the ground through the aperture 49 in the top surface 23, in a manner as will be hereinafter described.

A shield 29, which is effectively half a cylinder having the same diameter as the translucent bottom 21 of hood 13, located between a ridge 32 on hood 13, and a ridge 30 on the top 23 of base 31, is held there by the tendency of the shield material 29 to fold inwardly. The shield 29 may be slid around the perimeter of the translucent bottom 21 of hood 13 to thereby direct light to a certain segment of the general area within which the lantern is located. The shield 29 simply blocks off the light from the translucent bottom 21 in all other segment directions. The shield may be removed if it is desired to project light in all directions surrounding the lantern. With the shield in place, the velocity of the airflow in the unblocked segment of air channel 28 increases.

The hood 13 is supported by the base 31 and held at a distance from the top 23 of base 31 by support stanchions 25 and 27, for example. The translucent bottom 21 of hood 13 and the dome-shaped top 23 of base 31 form a 360-degree airflow channel into aperture 49 in top 23. As will be explained hereinafter, the flying insects that are attracted by the light emanating from the translucent bottom 21 and venture to the lantern 11 will be sucked into the airflow channel 28 and down aperture 49 in top 23 of base 31.

Base 31 is shown as having a certain aesthetic design including legs 33 upon which the entire lantern may be set. The legs keep the bottom 32 raised from the support surface so that the large exhaust aperture 61 (FIG. 2) in the bottom of base 31 is raised from any support surface upon which the lantern 11 is placed. If the lantern 11 is hung from its loop 15, this, of course, is not a problem.

Figure 2:
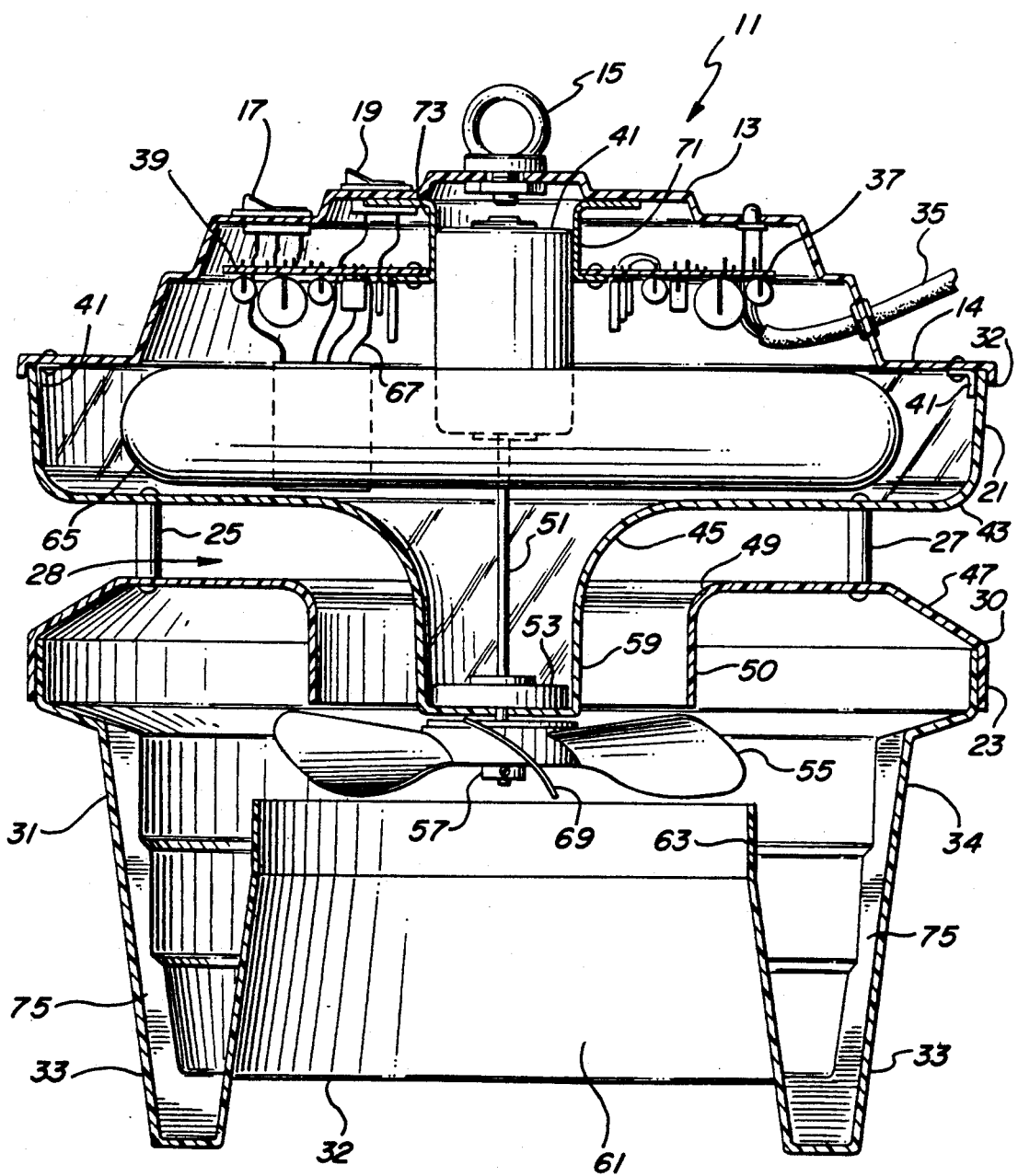
FIG. 2 is a cross-section of the lantern of FIG. 1 taken along line 2—2 looking in the direction of the arrows.

Reference is now made to FIG. 2, which illustrates the internal components of the lantern 11. FIG. 2 shows that the hood 13 of lantern 11 is composed of two exterior components, a top 14, and the translucent bottom 21. The top 14 is fastened to the translucent bottom 21 by any convenient means such as the brackets 41 illustrated. The top 14 overlays the edges of the bottom 21, creating the top ridge 32. Contained within the enclosure created by top 14 and bottom 21 is a toroidal fluorescent tube 65 located adjacent to the translucent bottom 21. When the light source 65 is energized, light will be emitted out of the entire translucent bottom 21, even the truncated cone portion which extends into top 23 and base 31.

Also contained within the hood 13 are two circuit boards 39 and 37. These circuit boards control energization of the light source 65 to which they are connected over lines 67, as directed by actuation of switches 17 and 19. The circuit boards also control the operation of electric motor 41, which is fastened to the upper portion of hood 13 by brackets 71 and 73. The energy source for both the light source 65 and the electric motor 41 is brought in over a power cord 35. The energy source may be 12-volt D.C. for portability or a low voltage A.C. circuit of the type that is used to energize lawn lights, for example.

The translucent bottom 21 of hood 13 is shaped to provide a streamlined airflow within air channel 28 by means of the convex curvature 43 on its outside, and the concave curvature 45 on the inside leading to the flow director 59. Flow director 59 is also the support for fan 55. The hood 13 is fixedly attached to and held at a fixed distance from the top 23 of base 31 by stanchions 25 and 27. Base 31 essentially consists of two parts, a top 23 and a bottom 34, which include legs 33. The top 23 simply snap-fits over the bottom 34.

Top 23 is shaped like a flattened dome in that the perimeter portion of top 23 is sloped downwardly. This provides a larger opening for flow channel 28 and acts to funnel the surrounding air into the aperture 49 located in the center of top 23. The flow channel 28 and the aperture 49 act as a flow restrictor in the airflow path, causing the velocity of the airflow to increase dramatically in the flow channel and at the aperture area, thereby sucking any flying insects around the openings of the flow channel 28 into the lantern.

A fan 55 is mounted to a shaft 51 by means of a collar 57. The shaft 51 is rotated by electric motor 41. The shaft is journalled through and supported by a rotary bearing 53 which is attached to the truncated end of the airflow director 59, which is an integral part of the translucent bottom 21. Airflow director 59 ends just below the walls 50 that extend down from aperture 49.

The force and direction of the airflow at the output side of the restrictor channel that ends with the walls 50 causes any insect being pulled into this area to be thrown against the inside wall of the bottom part 34 of base 31, and then fall to the bottom of base 31 into the internal cavity 75. Internal cavity 75 is the perimeter of the base 31 created by the aperture 61 and the upstanding walls 63 that ascend up to the fan 55.

The blades 69 of fan 55 are preferably pitched at a 60-degree angle and are aerodynamically shaped. The preferred embodiment of the lantern 11 utilizes a five-inch blade 55.

The luminance of the light source 65 in the hood 13 is equal to or greater than the camping lanterns and outdoor lanterns of the prior art. Thus, the light source 65 serves primarily to light the desired area and only secondarily to attract insects to their demise. The light from light source 65 emanates from the lantern 11 360 degrees through the translucent bottom 21 and downwardly towards the top 23 of base 31. The top 23 of base 31 has a smooth reflective surface that will cause light to be readily reflected therefrom. Thus, light will be reflected outwardly by the slope of perimeter 47 on top 23. Light will emanate downwardly and outwardly from the air director 59, a truncated cone, since it is also translucent material. Light will travel into and through the aperture 49 and the funnel created by aperture walls 50. This downwardly directed light will continue to travel past fan 55 into the exhaust funnel created by walls 63 and out the bottom aperture 61.

The result of light travelling through the funnel in base 31 in this manner is that light will be directed downwardly to the ground above which the lantern is hung, thereby eliminating any shadows or light dead zones on the ground. This highly desirable result is the by-product of the airflow channel 28 and its associated restrictive funnel 50 and exhaust funnel 63 serving to both direct airflow and to direct the light emanating from light source 65.

The exhaust funnel 63 has walls that are sloped outwardly as shown, preferably at an angle of 10 to 30 degrees from the vertical. These sloping walls create an exhaust cone that acts as an airflow amplifier that increases the velocity of the airflow into the input channel 28 and the aperture 49.

The resulting combination of the above-described elements is a highly desirable outdoor lantern which also serves to eradicate any and all flying insects that wander near its perimeter.

What is claimed is:

1. A combination lantern and flying insect eradicator, including a hood and a base, said combination comprising:

the hood having a top and bottom and containing a light source adjacent to said bottom, said bottom being translucent and contoured into a truncated cone around its symmetrical axis, the cone extending into an aperture in said base;

the base having a top and bottom, with the top contoured in a dome shape and an aperture therein at its symmetrical axis, the bottom having a larger exhaust aperture therein, said base being fixedly attached to and spaced from said hood so that the contoured bottom of said hood and the contoured top of said base are adjacent to each other; and a motor driven fan blade rotatably mounted and supported by the contoured bottom of said hood and located below the aperture in the top of said base.

2. The combination of claim 1 wherein said hood is circular and said light source comprises a toroidal-shaped tube having a diameter that is smaller than the diameter of said hood.

3. The combination of claim 2 wherein said light source comprises a fluorescent tube.

4. The combination of claim 3 wherein said light source is powered by a 12-volt direct current source.

5. The combination of claim 4 wherein said hood further comprises a manually operable switch for turning said light source on and off.

6. The combination of claim 1 wherein said hood supportably encloses an electric motor for rotating said fan blade.

7. The combination of claim 6 wherein said motor is powered by a 12-volt direct current source.

8. The combination of claim 7 wherein said hood further comprises a manually operable switch for turning said motor on and off.

9. The combination of claim 6 wherein said motor includes an output shaft extending through the contoured bottom of said hood to said fan.

10. The combination of claim 9 wherein said output shaft is journalled through a bearing structure attached to the inside of said hood bottom.

11. The combination of claim 10 wherein said bearing structure is located at the truncated end of the cone in said hood bottom.

12. The combination of claim 11 further comprising legs attached to said base that support said base and maintain the exhaust aperture above a support surface.

13. A combination lantern and flying insect eradicator, comprising:
- a hood having a top and bottom and containing a light source adjacent to said bottom, said light source being a toroidal-shaped tube having a diameter that is smaller than the diameter of said hood, said bottom being translucent and having a predetermined contour;
- a base having a top and bottom, with the top having a predetermined contour and an aperture therein, and the bottom having a larger exhaust aperture therein, and base being fixedly attached to and spaced from said hood so that the contoured bottom of said hood and the contoured top of said base are adjacent to each other;
- a motor driven fan blade rotatably mounted and supported by the contoured bottom of said hood and located below the aperture in the top of said base; and
- a half-cylinder reflector slidably attached to said hood and said base and covering up approximately half of the light source tube.

14. The combination of claim 1 wherein the aperture in the dome-shaped top is formed by the top folding down around its symmetrical center, thereby forming an aperture and an air funnel, said truncated cone extending into the air funnel.

15. The combination of claim 14 wherein the exhaust aperture in said base is aligned about the same symmetrical axis as the top aperture in said base, and further includes walls extending from below said fan blades and outwardly to the exhaust aperture in the bottom of said base.

16. The combination of claim 15 wherein the walls in said base exhaust aperture are cone-shaped, extending outwardly from just below said fan blade.

17. A combination lantern and flying insect eradicator comprising:
- a circular hood having a top and bottom and containing a light tube therein adjacent to the bottom, which is translucent;
- a base having a top and bottom with the top being dome-shaped and having an aperture therein with downwardly extending walls therefrom, the bottom having a large exhaust port with upwardly extending walls therefrom, said base being fixedly attached to and spaced from said hood so that the translucent bottom of said hood and the top of said base are adjacent to each other and form a funnel for directing airflow into the aperture in the dome-shaped top of said base, which acts like a flow restrictor in the airflow path to increase the velocity of the airflow therein; and
- a motor driven fan rotatably mounted and supported by the bottom of said hood and located below the downwardly extending walls of the aperture in the top of said base and above the upwardly extending walls from the aperture in the bottom of said base for creating airflow.

* * * * *